United States Patent
Yan et al.

(10) Patent No.: US 10,832,139 B2
(45) Date of Patent: Nov. 10, 2020

(54) NEURAL NETWORK ACCELERATION AND EMBEDDING COMPRESSION SYSTEMS AND METHODS WITH ACTIVATION SPARSIFICATION

(71) Applicant: MOFFETT TECHNOLOGIES CO., LIMITED, Mongkok (HK)

(72) Inventors: Enxu Yan, Los Altos, CA (US); Wei Wang, Los Altos, CA (US)

(73) Assignee: MOFFETT TECHNOLOGIES CO. LIMITED, Kowloon (HK)

( * ) Notice: Subject to any disclaimer, the term of this patent is extended or adjusted under 35 U.S.C. 154(b) by 0 days.

(21) Appl. No.: 16/446,938

(22) Filed: Jun. 20, 2019

(65) Prior Publication Data

US 2019/0392323 A1 Dec. 26, 2019

Related U.S. Application Data

(60) Provisional application No. 62/688,891, filed on Jun. 22, 2018.

(51) Int. Cl.
  *G06N 3/08* (2006.01)
  *G06T 7/10* (2017.01)
(52) U.S. Cl.
  CPC ........... *G06N 3/084* (2013.01); *G06N 3/082* (2013.01); *G06T 7/10* (2017.01); *G06T 2207/20132* (2013.01)
(58) Field of Classification Search
  None
  See application file for complete search history.

(56) References Cited

U.S. PATENT DOCUMENTS

| | | | |
|---|---|---|---|
| 10,255,628 B2 * | 4/2019 | Li | ........................ G06Q 30/0631 |
| 2018/0046915 A1 | 2/2018 | Sun et al. | |
| 2019/0188567 A1 * | 6/2019 | Yao | ........................ G06N 3/04 |

FOREIGN PATENT DOCUMENTS

WO  WO2018/058509  4/2018

OTHER PUBLICATIONS

Liu et al. "Learning efficient convolutional networks through network slimming", ICCV, 2017, pp. 2755-2763.*
(Continued)

*Primary Examiner* — Li Wu Chang
(74) *Attorney, Agent, or Firm* — Morgan, Lewis & Bockius LLP (57) ABSTRACT

Systems, methods and computer-readable medium for (i) accelerating the inference speed of a deep neural network (DNN), and (ii) compressing the vector representations produced by the DNN out of a variety of input data, such as image, audio, video and text. A method embodiment takes as inputs a neural network architecture and a task-dependent loss function, measuring how well a neural network performs on a training data set, and outputs a deep neural network with sparse neuron activations. The invented procedure augments an existing training objective function of a DNN with regularization terms that encourage sparse activation of neurons, and compresses the DNN by solving the optimization problem with a variety of algorithms. The present disclosure also shows how to utilize the sparsity of activations during the inference of DNNs so the number of arithmetic operations can be reduced proportionately, and how to use the sparse representations produced by the DNNs to build an efficient search engine.

29 Claims, 10 Drawing Sheets

(56) References Cited

OTHER PUBLICATIONS

Alvarez et al. "Learning the Number of Neurons in Deep Networks", NIPS, 2016, pp. 9.*
International Search Report, PCT/US2019/38422, dated Oct. 28, 2019.
Liu, Zhuang, et al. "Rethinking the value of network pruning." arXiv preprint arXiv:1810.05270 (2018).
Gale, Trevor, Erich Elsen, and Sara Hooker. "The state of sparsity in deep neural networks." arXiv preprint arXiv:1902.09574 (2019).
Han, Song, Huizi Mao, and William J. Dally. "Deep compression: Compressing deep neural networks with pruning, trained quantization and huffman coding." arXiv preprint arXiv:1510.00149 (2015).
Guo, Yiwen, Anbang Yao, and Yurong Chen. "Dynamic network surgery for efficient dnns." Advances in neural information processing systems. 2016.
Molchanov, Dmitry, Arsenii Ashukha, and Dmitry Vetrov. "Variational dropout sparsifies deep neural networks." Proceedings of the 34th International Conference on Machine Learning—vol. 70. JMLR. org, 2017.
Louizos, Christos, Max Welling, and Diederik P. Kingma. "Learning Sparse Neural Networks through $ L\_0 $ Regularization." arXiv preprint arXiv:1712.01312 (2017).
Frankle, Jonathan, and Michael Carbin. "The lottery ticket hypothesis: Finding sparse, trainable neural networks." arXiv preprint arXiv:1803.03635 (2018).

\* cited by examiner

NEURAL NETWORK ACCELERATION AND EMBEDDING COMPRESSION SYSTEMS AND METHODS WITH ACTIVATION SPARSIFICATION

CROSS REFERENCE TO RELATED APPLICATION

The present application claims priority to and the benefit of U.S. Provisional Application Ser. No. 62/688,891 entitled "Neural Network Acceleration and Embedding Compression via Activation Sparsification," filed on 22 Jun. 2018, the disclosure of which is incorporated herein by reference in its entirety.

BACKGROUND

Technical Field

The present disclosure generally relates to artificial intelligence, more particularly to faster computational methodologies by reducing the number of operations with less activation of neurons in deep neural networks.

Background Art

Deep Neural Networks (DNNs) have become the most widely used approach in the domain of Artificial Intelligence (AI) for extracting high-level information from lower-level data such as image, video, audio and text. However, the expensive computational cost of DNN deters its use in applications with tighter budgets for energy consumption, storage space or latency tolerance, especially on edge devices such as mobile phones and surveillance camera.

The computational cost of DNN derives from a variety of sources. First, the DNN model parameters are typically in the order of millions or tens of millions, resulting in huge storage cost, and deters the placement of model parameters at smaller but faster storage devices in the memory hierarchy. Second, the number of neurons in the computation graph of a DNN consumes huge memory space and requires typically billions of arithmetic operations during runtime. Third, search engines based on vector representations generated by neural networks, such as face comparison engines, are typically much more computationally expensive than traditional text-based search engine, due in part to the high-dimensional dense vector representations (embeddings) produced by the DNNs.

In recent years, ongoing research efforts have focused on reducing the computational cost of DNN inference. Some of these conventional approaches, however, have been directed to trim the DNN models, including (i) reducing the number of non-zero parameters (connections between neurons) in the DNN filters, (ii) trimming parts of the network, such as channels of neurons or columns/rows of filters, and (iii) quantizing the value ranges of parameters and neurons to reduce the number of bits for representing those values.

Accordingly, it is desirable to have methodologies and systems that provide a more efficient DNN model that reduces the high computational intensity.

SUMMARY OF THE DISCLOSURE

Embodiments of the present disclosure are directed to methods, computer program products, and computer systems of a complimentary technique to the above mentioned approaches, which trains (or fine-tunes) a neural network to discourage the activations of neurons in a DNN such that, during inference, a significant portion of (different) neurons are not activated when running on different input data. Each input data activates a small fraction of the neurons, thereby reducing the number of operations required during inference and also the storage required for the vector representation (embedding) produced by a DNN for each input data, proportionately to the number of disactivated neurons.

Broadly stated, a method for reducing the computation cost of deep neural network (DNN) inferencing comprises determining a loss function based on a specific task wherein the loss function is capable of measuring the predictive performance of a deep neural network; retrieving an initial deep neural network having a DNN computation graph and associated parameter values; iteratively sparsifying the number of active neurons of a deep neural network until the convergence of the sparsity ratio; and generating an activation-sparsified deep neural network as the output.

The structures and methods of the present disclosure are disclosed in detail in the description below. This summary does not purport to define the disclosure. The disclosure is defined by the claims. These and other embodiments, features, aspects, and advantages of the disclosure will become better understood with regard to the following description, appended claims, and accompanying drawings.

BRIEF DESCRIPTION OF THE DRAWINGS

The disclosure will be described with respect to specific embodiments thereof, and reference will be made to the drawings, in which.

DETAILED DESCRIPTION

A description of structural embodiments and methods of the present disclosure is provided with reference to FIGS. 1-10. It is to be understood that there is no intention to limit the disclosure to the specifically disclosed embodiments, but that the disclosure may be practiced using other features, elements, methods, and embodiments. Like elements in various embodiments are commonly referred to with like reference numerals.

The following definitions apply to the elements and steps described herein. These terms may likewise be expanded upon.

Acceleration—changing a DNN such that the number of arithmetic operations required for computing the DNN function is reduced.

Activation Compressor—a software system that takes in a DNN as input and outputs a Sparsified DNN, obtained by iteratively tuning the parameters of the DNN towards directions (gradients) that reduces both the Loss Function and the Activation Regularizer.

Activation Regularizer—a function that measures the activation sparsification level of a DNN with respect to a particular training dataset. The more sparse a DNN, the lower the values of regularizer.

Deep Neural Network (DNN)—A Deep Neural Network (DNN) is a composite function composed of several layers of elementary functions, where each function takes the output of previous layers as input and computes a new set of outputs. The outputs of each layer are termed Neurons, and a Neuron is Activated (or Active) if it has a non-zero value, and is Disactivated (or Inactive) otherwise.

Loss Function—a function that measures how well a DNN performs on a particular task with respect to a particular training data set. The better a DNN performs, the lower its loss function values.

Sparsification (Sparsify)—a methodology of training a DNN (i.e., tuning the parameters of a DNN) such that the number of Activated Neurons becomes significantly less (e.g., at least less than half, typically less than a quarter) than the total number of Neurons.

Figure 1:
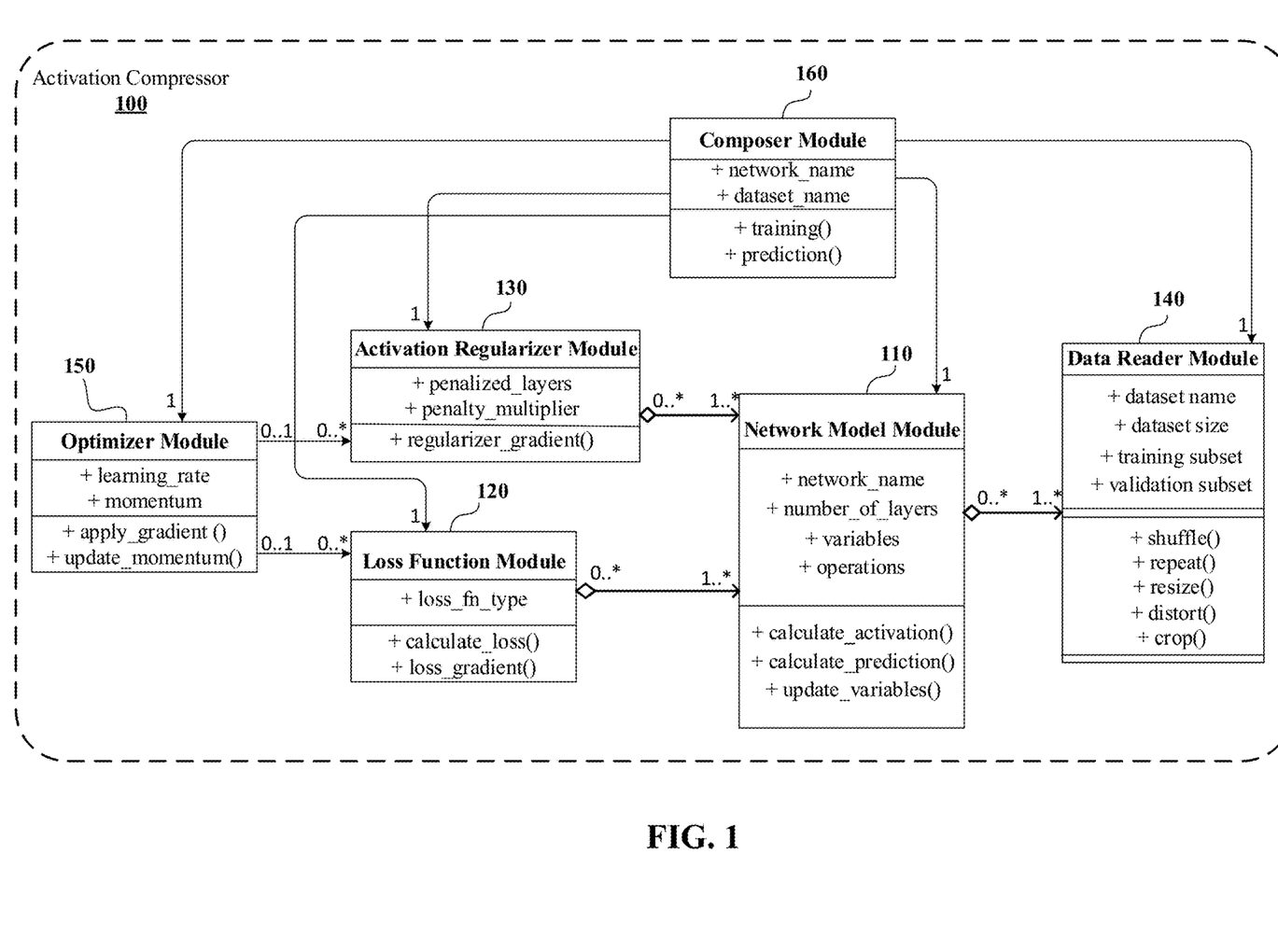
FIG. 1 is a system diagram illustrating an overall software architecture of the activation compressor in accordance with the present disclosure.

FIG. 1 is a system diagram illustrating an overall software architecture of the activation compressor 100. The activation compressor 100 includes a network module 110, a loss function module (or "loss function") 120, an activation regularizer module (or "activation regularizer") 130, a data reader module (or "data reader") 140, an optimizer module (or "optimizer") 150, and a composer module (or "composer") 160. The network model module 110 includes a collection of elementary operations (i.e., numerical functions) and respective derivatives, and includes a complex function (i.e., DNN) through a composition of the elementary functions. In addition, the network model module 110 includes a collection of variables that parameterize the complex function. The complex function is modularized into several layers, where each layer takes the output of previous layers as input and computes a new set of outputs. The network model module 110 computes the activation values of neurons (i.e., the outputs of each layer), and the computation of prediction (i.e. the outputs of the last layer). Formally, let $X^{(0)}: N \times D_1^{(0)} \ldots \times D_P^{(0)} \times K^0$ be an input tensor where N is the number of samples (or batch size), and $D_1^{(0)}, \ldots, D_P^{(0)}, K^0$ are the dimensions of signals. A DNN typically comprises several layers. Let $j=1 \ldots J$ be the layer index. A DNN can be expressed as a composition of a series of functions, as represented below in Eq. (1):

$$X^{(j)} := \sigma_{W^{(j)}}(X^{(j-1)}), j=1 \ldots J, \quad (1)$$

where $\sigma_{W^{(j)}}(X^{(j-1)})$ denotes the function of layer (j), parameterized by a tensor called filter $W^{(j)}: K^{(j-1)} \times C_0^{(j)} \ldots \times C_P^{(j)} \times K^{(j)}$, and $X^{(j-1)}: N \times D_1^{(j-1)} \ldots \times D_P^{(j-1)}$ is the input tensor of (j)-th layer. The functions typically used are, for example, (i) convolution layer with Relu activation:

$$[\sigma_W(X)]_{i,k} := \left[ \sum_{m=1}^{K^{(j-1)}} X_{i,:,m} * W_{m,:,k} \right]_+ ,$$

where * is p-dimensional convolution operator, (ii) fully-connected layer with Relu activation:

$$[\sigma_W(X)]_{i,k} := [X_{i,:} W_{:,k}]_+,$$

and some other commonly used operations such as max-pooling, zero-padding and reshaping. In the software architecture of the activation compressor 100, the applicable functions, and their numerical derivatives, are implemented in the Network Model module 110 as shown in FIG. 1.

The loss function module 120 is configured to provide definition and computation of a penalty value that measures the discrepancy between a prediction and a ground-truth answer. The loss function module 120 also computes the derivative of the penalty value with respect to the prediction. Formally, let $X^{(J)}: N \times K$ be the outputs of the last layer of the DNN, which provides K scores (i.e. logits) of each sample that relate to the labels of our target task Y: $N \times K$ The task-dependent loss function $$L(X^{(J)}) := \frac{1}{N} \sum_{i=1}^{N} \ell(X_i^{(J)}, Y_i)$$

measures discrepancy between outputs predicted from the DNN on a given training data set $\{X_i^{(J)}\}_{i=1}^{N}$ and the given correct outputs on the training set $\{Y_i\}_{i=1}^{N}$. Examples of loss functions are regression loss where $$l(x,y) = \frac{1}{2}\|x-y\|^2$$

where x is K-dimensional predicted score vector and y is ground-truth correct output. Another example of loss function is cross entropy loss where $$\ell(x, y) = \log \sum_{k=1}^{K} \exp(x_k) - \frac{1}{K} \sum_{k=1}^{K} x_k 1_{[y_k == 1]}.$$

The activation regularizer module 130 is configured to provide the definition and computation of a penalty value (and its derivative) that measures the level of activation of all neurons of the network, by minimizing which one can sparsify the number of active neurons in the network. There are two embodiments of the activation regularizer 130. A first embodiment of the activation regularizer 130 directly regularizes the value of activation. A second embodiment of the activation regularizer 130 regularizes parameters that control the sparsity level of activation of each layer.

An example of the first embodiment of the activation regularizer 130 is $\Sigma_{l=1}^{J-1} \rho_l \|X^{(l)}\|_1$, where $\{\rho_l\}_{j=1}^{J-1}$ represents the tuning hyperparameters and $\|X\|_1$ (summation of all absolute values of X) is a convex surrogate function of X that approximately measures how many non-zero components are in X. Note $X^{(j)}$ is a function of parameters associated all layers before layer j (i.e. $\{W^{(j')}\}_{j' \leq j}$).

The second embodiment of the activation regularizer 130 is used together with activation functions having parameters that control the sparsity level of activation. One example of such activation function is represented as follows $$[\alpha_r(X)]_k := \begin{cases} vec(X)_k, & k \in top_r(vec(X)) \\ 0, & o.w. \end{cases} \quad \text{Eq. (2)}$$

which preserves only values of the top-r elements with largest values and suppresses the remaining to be zeros. This special type of activation function is used to replace other activation functions used in a DNN layer $X^{(j)}:=\sigma_{W^{(j)}}(X^{(j-1)})$. Since the activation function Eq. (2) is not Lipschitz-continuous, in practice we employ a smoothed version of the function of the following form $$\alpha_r(X):=vec(X)\circ proj_{C_r}(vec(X)) \qquad \text{Eq. (3)}$$

where the symbol ∘ denotes Hadamard (element-wise) product and the term $proj_{C_r}(\bullet)$ denotes projection onto the convex set $C_r:=\{q|0\leq q_i\leq 1,\Sigma_i q_i\leq r\}$. In this example, the symbol "r" denotes the control parameter that controls the sparsity level of $\alpha_{0,r}(X)$. Then a simple example of the activation regularizer 130 is $\Sigma_{l=1}^{J-1}\rho_l r_l$, where $r_l$, l=1 . . . J represents the control parameters of each layer.

The data reader module 140 includes the pipeline for obtaining input data for the DNN from data sources. The pipeline includes cropping, subsampling (or upsampling), batching, and whitening (normalization). The optimizer module 150 is configured to adjust the values of variables in the network model in order to decrease an objective function comprising the loss function 120 and the activation regularizer 130. In one embodiment, the adjustment is determined by the derivatives of the loss function 120 and the activation regularizer 130 with respect to the variables. The composer 160 is a high-level component of the software that schedules and organizes the interactions among other components, and determines the relative strength between the loss function 120 and the activation regularizer 130.

Figure 2:
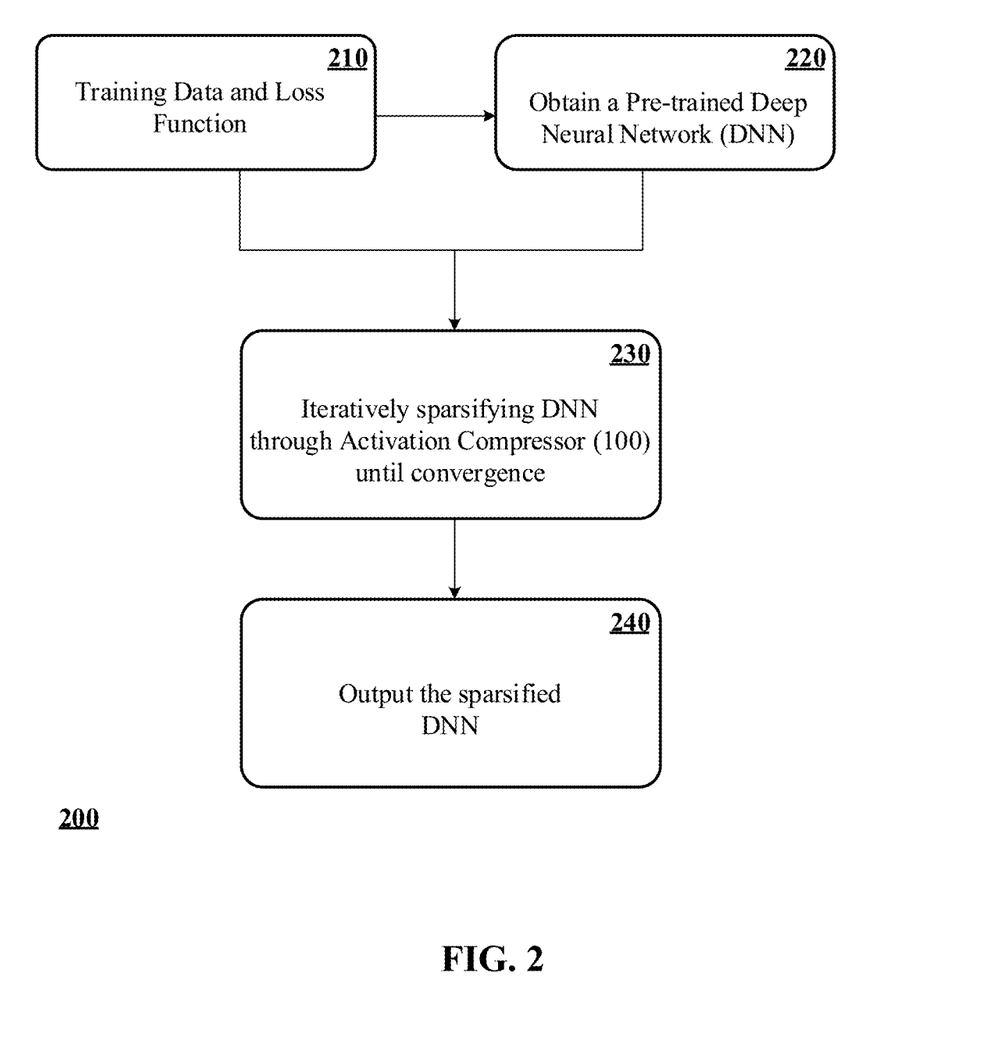
FIG. 2 is a flow diagram illustrating the inputs and outputs of the activation compressor in accordance with the present disclosure.

FIG. 2 is a flow diagram illustrating the inputs and outputs of a compression method 200. There are two inputs to the procedure: (i) at step 210, a training data set of correct input-output pairs for a DNN, measuring and improving the predictive performance of a DNN on a specific task of a particular loss function; and (ii) at step 220, an architecture (computation graph) of DNN, with or without pre-trained parameter values. At step 230 ("compression process"), the activation compressor 100 iteratively sparsifying a DNN until convergence. At step 240, the compression method 200 generates an output of a compressed DNN with the same architecture but different parameter values. The compression method 200 compresses the DNN such that it has sparse activation: the number of non-zero elements (activated neurons) of each layer $X^{(j)}$ is small.

Figure 3:
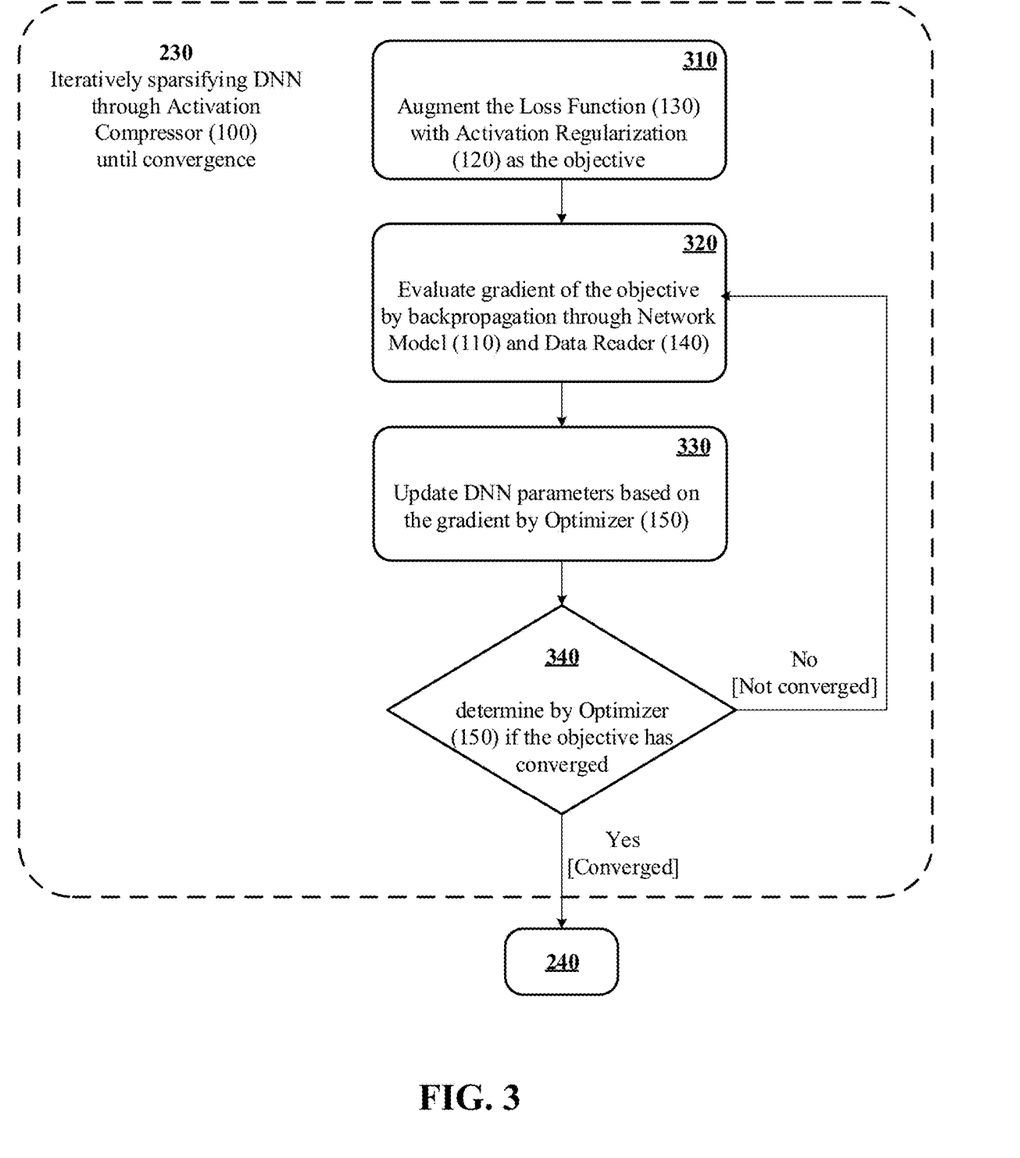
FIG. 3 is a flow diagram illustrating one embodiment of the activation compressor in accordance with the present disclosure.

FIG. 3 is a flow diagram illustrating one embodiment of the compression process 230. The compression process 230 alternates between the gradient evaluation at step 320 and the parameter update at step 330, until meeting the termination criteria at step 340 of the optimizer 150 (i.e., the change in objective or the magnitude of gradient being sufficiently small based on a predetermined threshold). The term $W:=\{W^{(j)}\}_{j=1...J}$ denotes a collection of parameters of all layers. The compression process 230 minimizes the objective function $$\min_{W^j, j\in[J]} F(W) := L(X^{(J)}) + \sum_{j=1}^{J} R(X^{(j)})$$

where the term $L(X^{(j)})$ represents the loss function (that depends only on the outputs at last layer of DNN), and the term $R(X^{(j)})$ represents the activation regularizer 130 imposed on the output of j-th layer. Next, the compression process 230 at step 320 evaluates gradient of the objective by backpropagation through the network model 110 and the data reader 140. The compression process 230 computes the derivatives of F(W) with respect to all the parameters W, and the parameter update at step 330 changes the values of W according to the obtained gradient and an update equation determined by the optimizer. At step 340, the activation compressor 340 determines if the objective has converged. If the objective has not converged, the activation compressor 100 continues to iteratively sparsifying the DNN by processing through the gradient evaluation at step 320 and the parameter at step 330. Upon the convergence of the objective, the activation compressor 100 returns the process to step 240.

Figure 4:
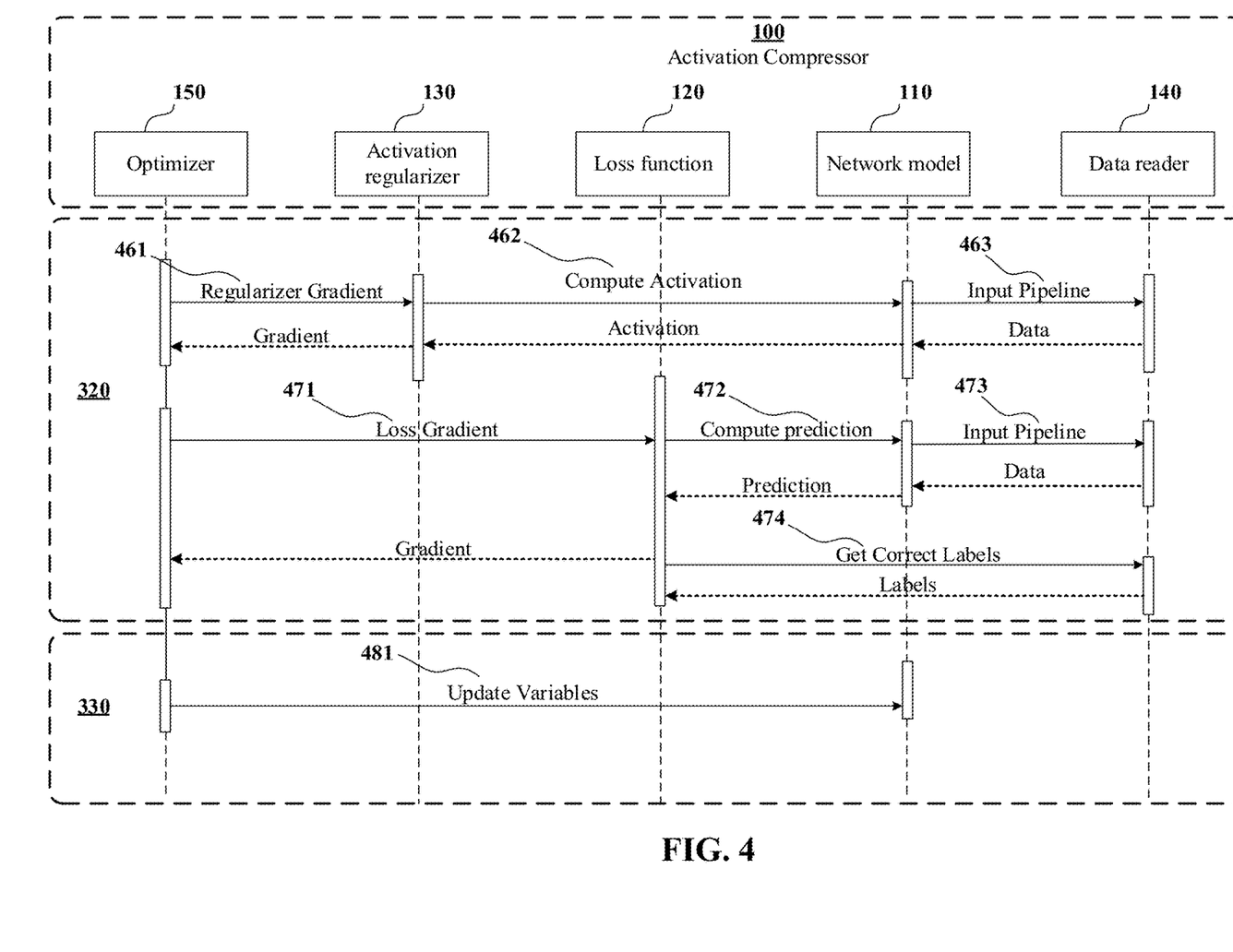
FIG. 4 is sequence diagram illustrating interactions between multiple software modules for the embodiment of the activation compressor in accordance with the present disclosure.

FIG. 4 is a sequence diagram illustrating interactions between multiple software modules for computing gradient evaluation at step 320 and the parameter update at step 330. Steps 461, 462 and 463 depict the gradient evaluation of activation regularizer $R(X^{(j)})$. At steps 461, 462 and 463, the optimizer 130 is configured to request gradient of the activation regularizer 130 with respect to the parameters W (i.e. $\nabla_W R$) from the regularizer gradient 461. The activation regularizer module 130 is then configured to request the network model module 110 to compute the activation values of all layers $\{X^{(j)}\}_{j=1...J}$ (462), which requires the data reader module 140 to provide input data from the input preprocessing pipeline 463.

Steps 471, 472 and 473 illustrate the gradient evaluation of loss function $L(X^{(j)})$. In steps 471, 472 and 473, the optimizer 150 is configured to request gradient of the loss function with respect to the parameters W (i.e. $\nabla_W L$) from the loss gradient 471 by the loss function module 120. The loss function module 120 is configured to request the network model module 110 to compute the values of the prediction (output) layers $X^{(j)}$ (472), which further requires the data reader module 140 to provide input data from the input preprocessing pipeline 473 to the network model module 110 and correct labels to the loss function module 120.

Referring to the first embodiment of activation regularizer as described above, the gradient evaluation of the objective function F(W) takes the form of Augmented Backpropagation, where the outputs of DNN $X^{(j)}$ via a forward pass is computed:

$$X^{(j)}:=\sigma_{W^{(j)}}(X^{(j-1)}), j=1 \ldots L \qquad (1)$$

and then backpropagate the gradient $\nabla(L(X^{(J)}))$ to the parameters of each layer with augmented gradients from the regularization terms:

$$\nabla_{X^{(j)}}F:=\sigma_{W^{(j+1)}}^{-1}(\nabla_{X^{(j+1)}}F)+\rho_j sign(X^{(j)}),$$

for layers j=(J-1) . . . 1, where the term $\sigma_{W^{(j+1)}}^{-1}(\bullet)$ represents a backpropagation function for the layer operation $\sigma_{W^{(j+1)}}(\bullet)$. The second term $\rho_j sign(X^{(j)})$ represents the key of the compression process, which augments the backpropagated information with a momentum that reduces the value of neuron activations towards zeros, and the gradient to the parameters $W^{(j)}$ of each layer can be obtained from $X^{(j-1)}$ and $\nabla_{X^{(j)}}F$ based on the same rule of backpropagation in a standard backpropagation process.

Referring to the second embodiment of activation regularizer as described above, the gradient evaluation of the objective function F(W) first performs a forward propagation similar to Eq. (1) but with parameterized activation function such as Eq. (2) or Eq. (3), which yields intermediate representation $X^{(j)}$ of number of activations controlled by some parameters. During the backpropagation process, the key difference lies in the step of propagating the gradient with respect to the activation output $\nabla_{\alpha_r(vec(X))}F$ backward to obtain the gradient with respect to the activation input $\nabla_{vec(X)}F$, which can be computed by $$\nabla_{vec(X)}F := \nabla_{q_r(vec(X))} F \circ q_r(X) \quad (4)$$

For the non-smooth sparse activation function in Eq. (3), the mathematical representation is as follows:

$$[q_r(X)]_k := \begin{cases} 1, & k \in top_r(vec(X)) \\ 0, & o.w. \end{cases}$$

while for the smoothed version, the mathematical representation is as follows:

$$q_r(X) := proj_{C_r}(vec(X))$$

Where the term $proj_{C_r}(\bullet)$ denotes the operation of projection onto the convex set $C_r := \{q | 0 \leq qi \leq 1, \Sigma_i q_i \leq r\}$. Since in either case, q(X) is a very sparse vector, the intermediate gradient $\nabla_{vec(X)}F$ in Eq. (4) during backpropagation is sparsifed, which can be used to achieve a significant speedup in the computation of expensive operations in a DNN such as convolution and matrix multiplication.

The procedure Update Variables at step 481 implements optimization algorithms that determine how values of DNN parameters are updated according to gradients computed from the backpropagation process. This part employs standard first-order optimization algorithms that use, in one embodiment, only gradient (and its history during iterations) to determine the update direction of parameters W, such as Stochastic Gradient Descent (SGD), Stochastic Variance-Reduced Gradient method (SVRG), Adaptaive gradient method (Adagrad), Root-Mean-Square propagation (RMSprop), Adaptive-Moment Estimation method (ADAM).

Figure 5:
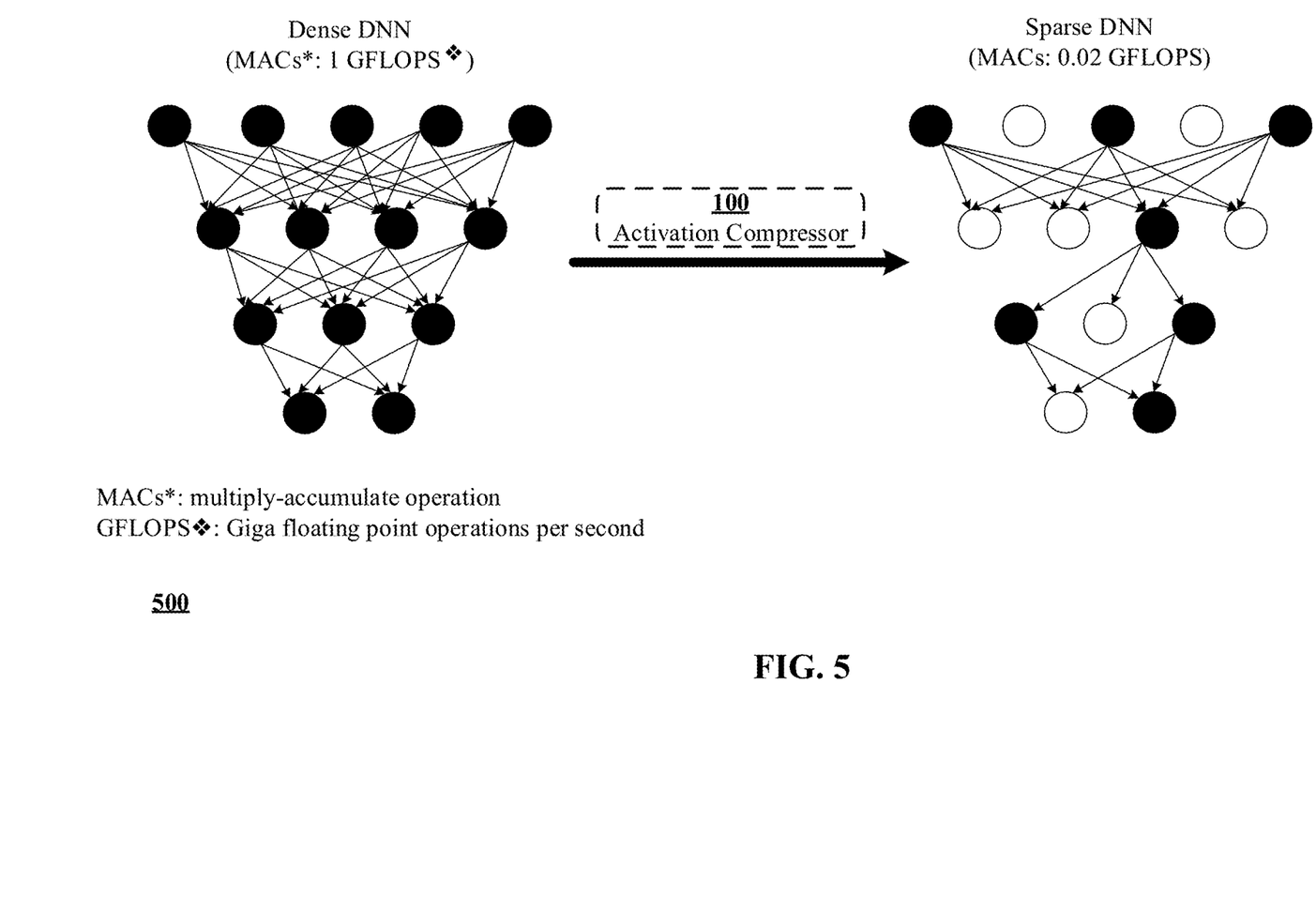
FIG. 5 is a block diagram illustrating the input and output of the activation compressor system in accordance with the present disclosure

FIG. 5. is a graphical diagram 500 illustrating how the sparisified activations as the inputs of each layer can significantly improve the efficiency of a DNN. Specifically, in one embodiment of computing convolution, generally the most expensive operation in DNN, that accesses the activated neurons and accesses the connection edges between neurons of non-zero weights. Methodologies of the disclosure can be typically integrated with other techniques that sparsify the non-zero connections (filter weights) between neurons.

In the example below, both the neuron activation and also the neuron connections (of non-zero weights) are assumed being sparse. A two-dimensional convolution is used as an example. One of skilled in the art would recognize that the two-dimensional convolution can be extended to multi-dimensional convolution without departing from the spirit of the present disclosure. The convolution between input neurons x: $D_1 \times D_2 \times K_0$ and a filter W: $K_0 \times C_1 \times C_2 \times K_1$ results in a 3D tensor Z: $x(D_i - C_1 + 1) \times (D_2 - C2 + 1) \times K_1$, related by $$Z_{:,:,k} = \sum_{c=1}^{K_0} X_{:,:,c} * W_{c,:,:,k}, k \in [K_1]$$

where the symbol * denotes the convolution operation. Suppose X is stored as a sparse list of index-value pairs and each input channel of the filter is stored also as a sparse list of index-value pairs, denoted as $list_X$ and $list_{W_c}$, to exploit the sparse structures of both X and W, the implementation of convolution can be summarized as follows:

```
Z_: = 0.
for ((i, j, c), u) ∈ list_X do
    for ((r s, k), v) ∈ listw_c do
        if i - r ≥ 0 and j - s ≥ 0 then
            Z_{i-r,j-s,k} += u*v.
        end if
    end for
end for
```

The number of arithmetic operations used in the above procedure is proportional to the number of non-zero elements, instead of the original shapes, of both W and X Therefore, through the sparsification procedure introduced in FIG. 4, one can significantly reduce the load of computation. Note since the fully-connected layer in DNNs can be cast as a special case of convolution, the above procedure can be also used for the fully-connected layers.

In addition to the improvement of inference speed, the sparsification also compresses the embeddings (i.e. Neuron Activations of last few layers) produced by the DNNs. The embedding produced by a DNN often serves as semantic vector representations of the raw-input data, such as image, audio, video and text. Take images as an example of input data, the similarity between two images can be measured by the inner product between embeddings of the two images generated by the DNN. Then a semantic search engine of images can be built upon those embeddings. Formally, let $\{x_1, x_2, \ldots, x_N\}$ be the collection of images in the databases, and $\{z_1, z_2, \ldots, z_N\}$ be the embeddings of those images produced by a DNN. A search engine performs the following operations: (i) Given a query image $x_q$, generate its embedding $z_q$ by a DNN, (ii) Return a list of images whose embeddings $\{z_{r1}, z_{r2}, \ldots, z_{rm}\}$ have highest inner product to $z_q$ among the database of images. In this application, Activation Sparisification (100) yields two advantages. First, by sparsifying the activations, it significantly reduces the space required to store those embeddings; second, the similarity computation can be significantly speed up using the computation procedure described above.

FIGS. 6, 7, 8 and 9 illustrate four examples of commercial applications of the activation compressor 100, where the methodologies of the present disclosure enhances the inference efficiency for (i) Face Recognition, (ii) Image Translation, (iii) Language Translation and (iv) Speech Recognition.

Figure 6:
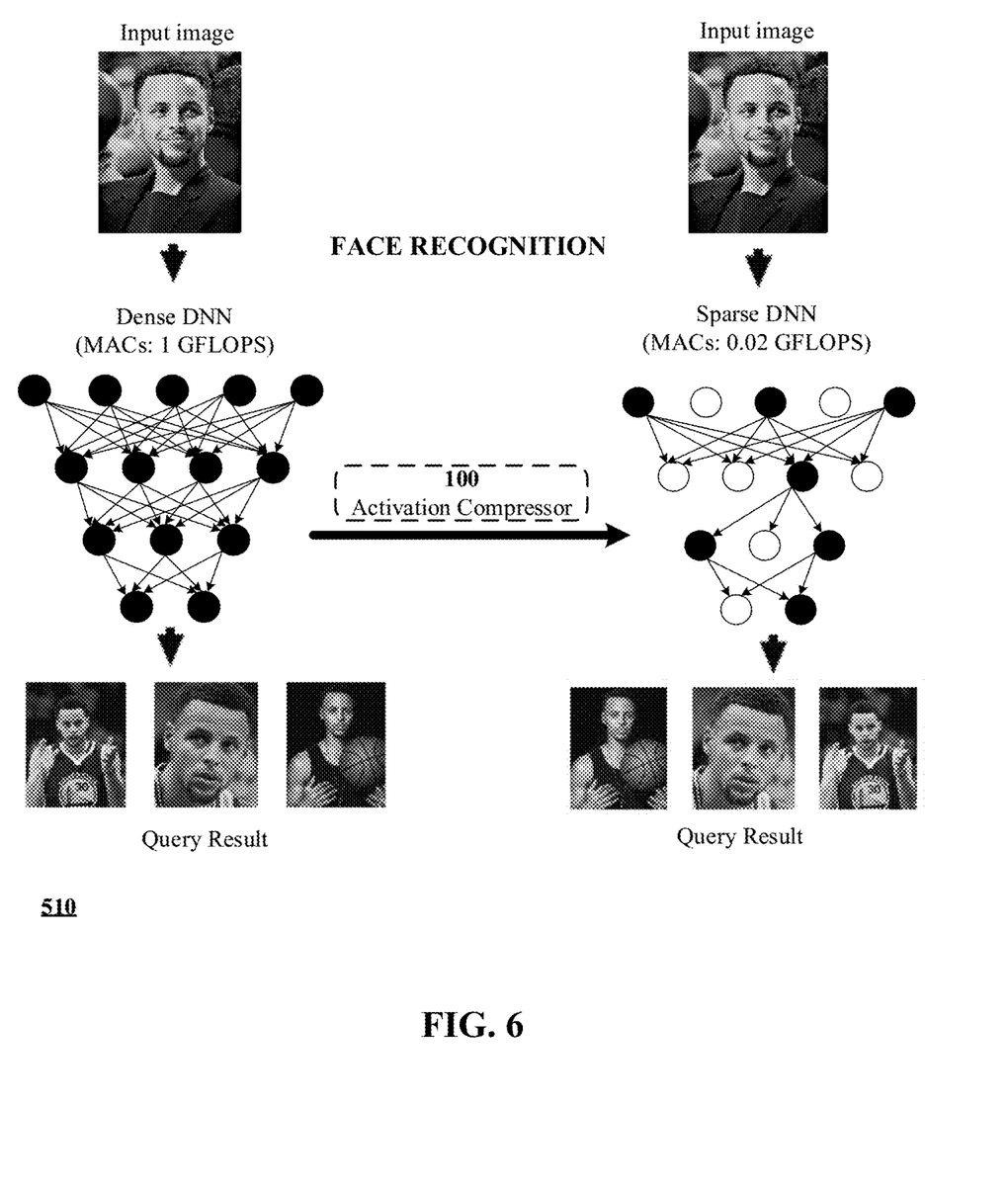
FIGS. 6-9 are pictorial diagrams illustrating commercial applications of the activation compressor system in accordance with the present disclosure.

FIG. 6 is a graphical diagram 510 demonstrating the present disclosure to the application of Face Recognition, where Activation Compressor 100 reduces the number of arithmetic operations required to generate a semantic embedding of a Face through DNN. Through the similarity between two such face embeddings, one can distinguish whether the two images contain the same person.

Figure 7:
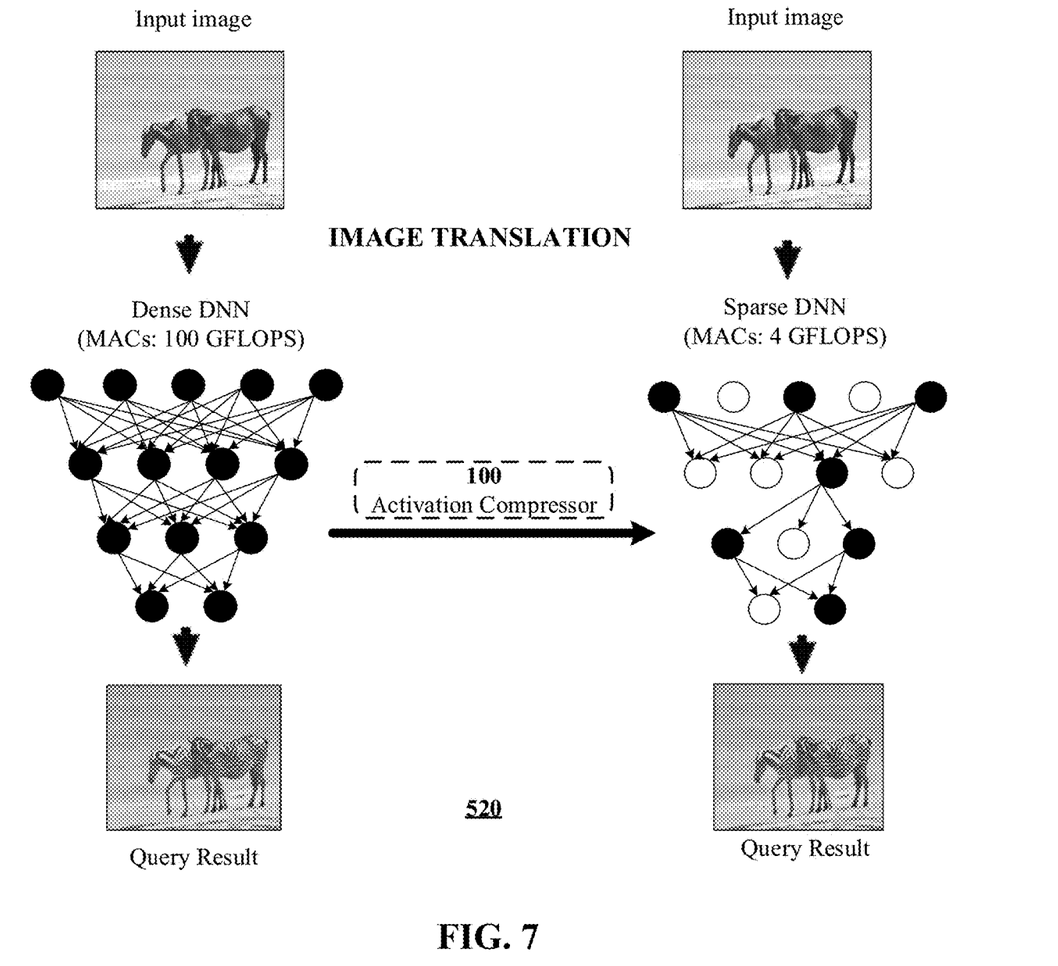

FIG. 7 is a graphical diagram 520 demonstrating the present disclosure to the application of Image Translation, where a DNN takes in an image as input and outputs an image of different styles (e.g., changing the texture, lightening condition etc.). An Activation Compressor 100 can be used to reduces the number of arithmetic operations required by the DNN in order to translate the style of an image.

Figure 8:
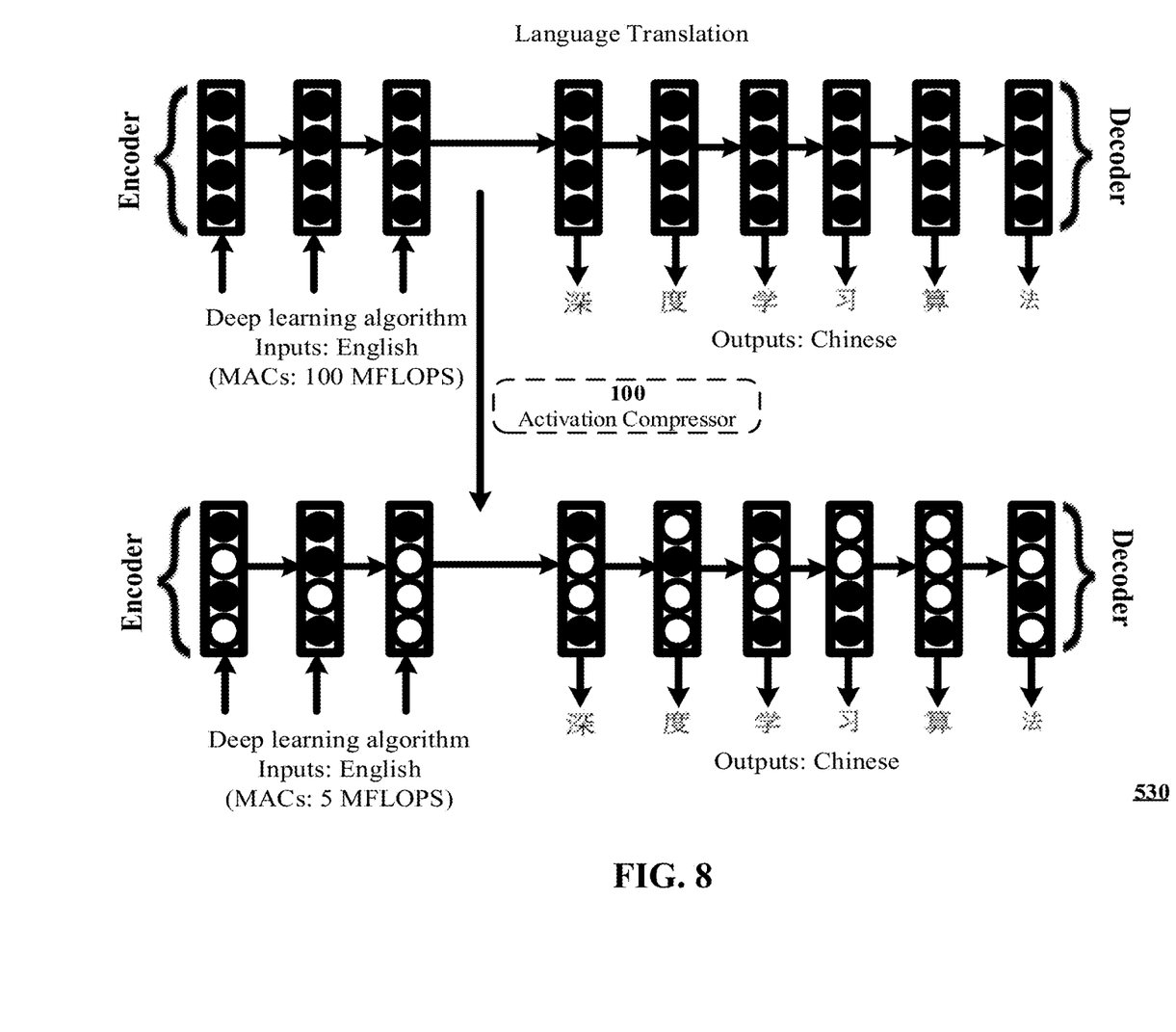

FIG. 8 is a graphical diagram 530 demonstrating the present disclosure to the application of Language Translation, where a Recurrent Neural Network (RNN, a special type of DNN) takes English word tokens as input and outputs Chinese characters. The Activation Compressor 100 reduces the number of active neurons, and thus the number of arithmetic operations, in both the encoder and the decoder parts of the RNN.

Figure 9:
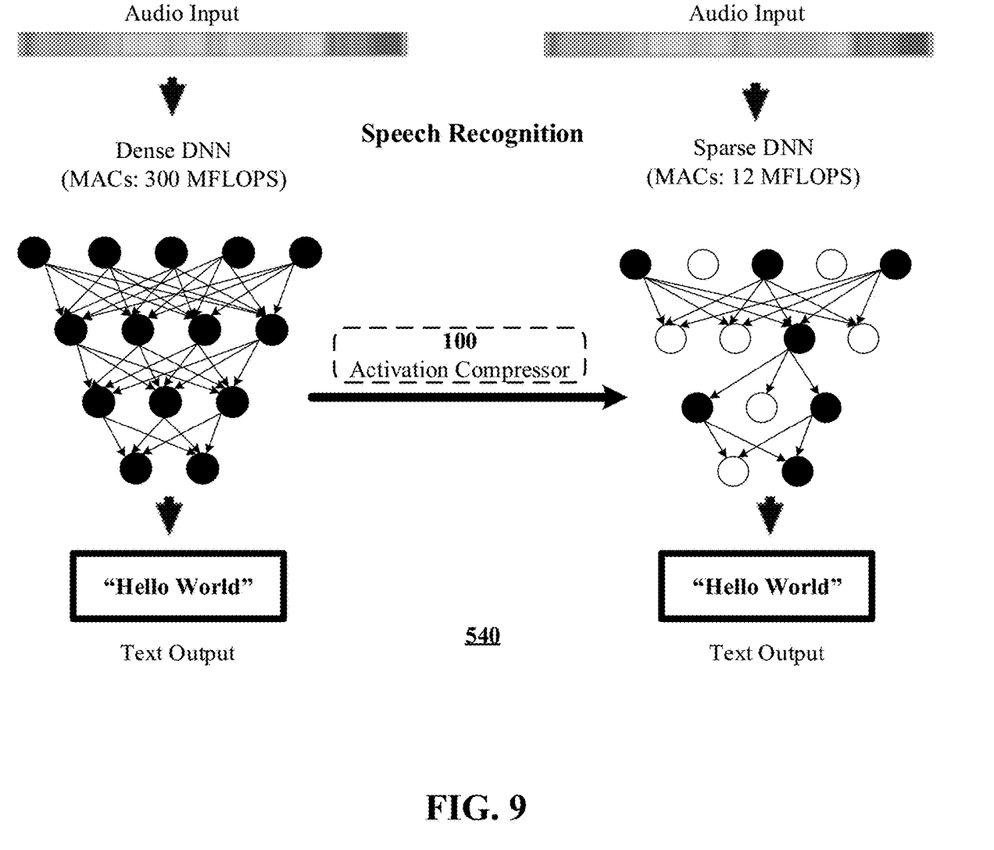

FIG. 9 is a graphical diagram 540 illustrating application of Activation Compressor 100 to a DNN trained for speech recognition where the DNN takes audio wave signal as input and outputs human language words contained in the audio signal.

Figure 10:
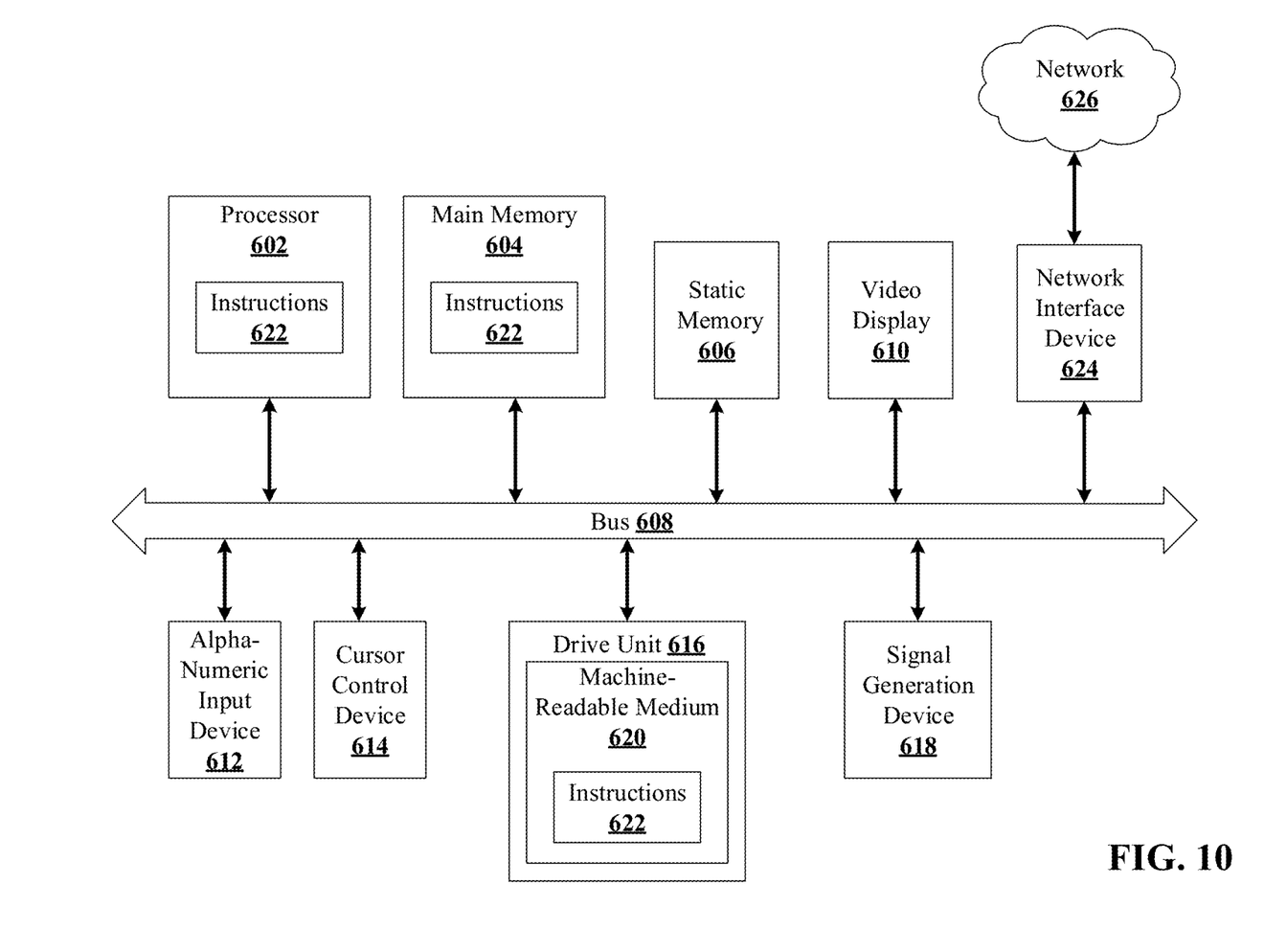
FIG. 10 is a block diagram illustrating an example of a computer device on which computer-executable instructions to perform the methodologies discussed herein may be installed and run in accordance with the present disclosure.

As alluded to above, the various computer-based devices discussed in connection with the present invention may share similar attributes. FIG. 10 illustrates an exemplary form of a computer system 600, in which a set of instructions can be executed to cause the computer system to perform any one or more of the methodologies discussed herein. The computer devices 600 may represent any or all of the clients, servers, or network intermediary devices discussed herein. Further, while only a single machine is illustrated, the term "machine" shall also be taken to include any collection of machines that individually or jointly execute a set (or multiple sets) of instructions to perform any one or more of the methodologies discussed herein. The exemplary computer system 600 includes a processor 602 (e.g., a central processing unit (CPU), a graphics processing unit (GPU), or both), a main memory 604 and a static memory 606, which communicate with each other via a bus 608. The computer system 600 may further include a video display unit 610 (e.g., a liquid crystal display (LCD)). The computer system 600 also includes an alphanumeric input device 612 (e.g., a keyboard), a cursor control device 614 (e.g., a mouse), a disk drive unit 616, a signal generation device 618 (e.g., a speaker), and a network interface device 624.

The disk drive unit 616 includes a machine-readable medium 620 on which is stored one or more sets of instructions (e.g., software 622) embodying anyone or more of the methodologies or functions described herein. The software 622 may also reside, completely or at least partially, within the main memory 604 and/or within the processor 602, During execution the computer system 600, the main memory 604, and the instruction-storing portions of processor 602 also constitute machine-readable media. The software 622 may further be transmitted or received over a network 626 via the network interface device 624.

While the machine-readable medium 620 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any tangible medium that is capable of storing a set of instructions for execution by the machine and that cause the machine to perform anyone or more of the methodologies of the present invention. The term "machine-readable medium" shall accordingly be taken to include, but not be limited to, solid-state memories, and optical and magnetic media.

Some portions of the detailed descriptions herein are presented in terms of algorithms and symbolic representations of operations on data within a computer memory or other storage device. These algorithmic descriptions and representations are the means used by those skilled in the data processing arts to most effectively convey the substance of their work to others skilled in the art. An algorithm is here, and generally, conceived to be a self-consistent sequence of processing blocks leading to a desired result. The processing blocks are those requiring physical manipulations of physical quantities. Throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), erasable programmable ROMs (EPROMs), electrically erasable and programmable ROMs (EEPROMs), magnetic or optical cards, application specific integrated circuits (ASICs), or any type of media suitable for storing electronic instructions, and each coupled to a computer system bus. Furthermore, the computers and/or other electronic devices referred to in the specification may include a single processor or may be architectures employing multiple processor designs for increased computing capability.

Moreover, terms such as "request", "client request", "requested object", or "object" may be used interchangeably to mean action(s), object(s), and/or information requested by a client from a network device, such as an intermediary or a server. In addition, the terms "response" or "server response" may be used interchangeably to mean corresponding action(s), object(s) and/or information returned from the network device. Furthermore, the terms "communication" and "client communication" may be used interchangeably to mean the overall process of a client making a request and the network device responding to the request.

In respect of any of the above system, device or apparatus aspects, there may further be provided method aspects comprising steps to carry out the functionality of the system. Additionally or alternatively, optional features may be found based on any one or more of the features described herein with respect to other aspects.

The present disclosure has been described in particular detail with respect to possible embodiments. Those skilled in the art will appreciate that the disclosure may be practiced in other embodiments. The particular naming of the components, capitalization of terms, the attributes, data structures, or any other programming or structural aspect is not mandatory or significant, and the mechanisms that implement the disclosure or its features may have different names, formats, or protocols. The system may be implemented via a combination of hardware and software, as described, or entirely in hardware elements, or entirely in software elements. The particular division of functionality between the various system components described herein is merely exemplary and not mandatory; functions performed by a single system component may instead be performed by multiple components, and functions performed by multiple components may instead be performed by a single component.

In various embodiments, the present disclosure can be implemented as a system or a method for performing the above-described techniques, either singly or in any combination. The combination of any specific features described herein is also provided, even if that combination is not explicitly described. In another embodiment, the present disclosure can be implemented as a computer program product comprising a computer-readable storage medium and computer program code, encoded on the medium, for causing a processor in a computing device or other electronic device to perform the above-described techniques.

As used herein, any reference to "one embodiment" or to "an embodiment" means that a particular feature, structure, or characteristic described in connection with the embodiments is included in at least one embodiment of the disclosure. The appearances of the phrase "in one embodiment" in various places in the specification are not necessarily all referring to the same embodiment.

It should be borne in mind, however, that all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing" or "computing" or "calculating" or "displaying" or "determining" or the like refer to the action and processes of a computer system, or similar electronic computing module and/or device, that manipulates and transforms data represented as physical (electronic) quantities within the computer system memories or registers or other such information storage, transmission, or display devices.

Certain aspects of the present disclosure include process steps and instructions described herein in the form of an algorithm. It should be noted that the process steps and instructions of the present disclosure could be embodied in software, firmware, and/or hardware, and, when embodied in software, it can be downloaded to reside on, and operated from, different platforms used by a variety of operating systems.

The algorithms and displays presented herein are not inherently related to any particular computer, virtualized system, or other apparatus. Various general-purpose systems may also be used with programs, in accordance with the teachings herein, or the systems may prove convenient to construct more specialized apparatus needed to perform the required method steps. The required structure for a variety of these systems will be apparent from the description provided herein. In addition, the present disclosure is not described with reference to any particular programming language. It will be appreciated that a variety of programming languages may be used to implement the teachings of the present disclosure as described herein, and any references above to specific languages are provided for disclosure of enablement and best mode of the present disclosure.

In various embodiments, the present disclosure can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the disclosure include a mobile phone, personal digital assistant, smartphone, kiosk, desktop computer, laptop computer, consumer electronic device, television, set-top box, or the like. An electronic device for implementing the present disclosure may use an operating system such as, for example, iOS available from Apple Inc. of Cupertino, Calif., Android available from Google Inc. of Mountain View, Calif., Microsoft Windows 10 available from Microsoft Corporation of Redmond, Wash., or any other operating system that is adapted for use on the device. In some embodiments, the electronic device for implementing the present disclosure includes functionality for communication over one or more networks, including for example a cellular telephone network, wireless network, and/or computer network such as the Internet.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The terms "a" or "an," as used herein, are defined as one as or more than one. The term "plurality," as used herein, is defined as two or as more than two. The term "another," as used herein, is defined as at least a second or more.

An ordinary artisan should require no additional explanation in developing the methods and systems described herein but may find some possibly helpful guidance in the preparation of these methods and systems by examining standardized reference works in the relevant art.

While the disclosure has been described with respect to a limited number of embodiments, those skilled in the art, having benefit of the above description, will appreciate that other embodiments may be devised which do not depart from the scope of the present disclosure as described herein. It should be noted that the language used in the specification has been principally selected for readability and instructional purposes, and may not have been selected to delineate or circumscribe the inventive subject matter. The terms used should not be construed to limit the disclosure to the specific embodiments disclosed in the specification and the claims, but the terms should be construed to include all methods and systems that operate under the claims set forth herein below. Accordingly, the disclosure is not limited by the disclosure, but instead its scope is to be determined entirely by the following claims.

What is claimed and desired to be secured by Letters Patent of the United States is:

1. A method for reducing the computation cost of Deep Neural Network (DNN) inferencing, comprising:
   (a) determining a loss function based on a specific task with N input samples and corresponding expected outputs that measures the predictive performance of a Deep Neural Network;

(b) retrieving an initial Deep Neural Network having a Deep Neural Network computation graph and associated parameter values, the Deep Neural Network being modularized into a plurality of layers, each layer taking the output of one or more previous layers as input data and computing a new set of outputs;

(c) augmenting the loss function with an activation regularizer that measures the activation level of a neuron activation matrix formed by all neurons of the Deep Neural Network on the input samples, thereby sparsifying the number of active neurons in the Deep Neural Network when being minimized;

(d) iteratively sparsifying the number of active neurons of the Deep Neural Network until the convergence of the number of active neurons, wherein the number of active neurons is reduced by a compressor in response to one or more input samples from the loss function across the neuron activation matrix with a first dimension of the matrix equal to the number of samples and a second dimension of the matrix equal to the total number of neurons, and any non-zero value in the neuron activation matrix indicating an active neuron; and (e) generating and outputting an activation-sparsified Deep Neural Network.

2. The method of claim 1, wherein the sparsifying step comprises augmenting the loss function by replacing the original activation function with a new set of sparsity-inducing activation functions to form an objective function.

3. The method of claim 1, wherein the sparsifying step comprises augmenting the loss function with one or more activation regularizations to form an objective function.

4. The method of claim 3, wherein the sparsifying step comprises evaluating a gradient of the objective function by backpropagation with the augmented activation regularizations.

5. The method of claim 3, wherein the sparsifying step comprises evaluating a gradient of the objective function by backpropagation with sparsity-inducing activation functions.

6. The method of claim 4, wherein the sparsifying step comprises iteratively tuning one or more parameters associated with the Deep Neural Network based on the gradient.

7. The method of claim 6, wherein the sparsifying step comprises determining whether the Deep Neural Network converges by checking whether the change in the number of active neurons becomes smaller than a predetermined threshold.

8. The method of claim 1, wherein the specific task comprises a training dataset.

9. The method of claim 1, wherein the number of active neurons of the Deep Neural Network at the last layer is reduced to obtain a compressed representation of the vector produced by the Deep Neural Network.

10. A computer-implemented activation compressor, comprising:
a network model module configured to compute the activation value of a plurality of neurons and to compute a prediction, the network module including a collection of variables that parameterize a Deep Neural Network (DNN), the Deep Neural Network being modularized into a plurality of layers, each layer taking the output of one or more previous layers as input data and computing a new set of outputs;
a loss function module, communicatively coupled to the network model module, configured to compute a first penalty value that measures the discrepancy between the prediction and a ground-truth answer, the loss function module configured to determine a loss function based on a specific task with N input samples and corresponding expected outputs that measure the predictive performance of the Deep Neural Network;
an activation regularizer, communicatively coupled to the network model module, configured to compute a second penalty value that measures the level of activation of all neurons of the network model module, the activation regularizer comprising a summation of a plurality of penalty functions, each penalty function being computed over a neuron activation matrix with a first dimension of the matrix equal to the number of samples and a second dimension of the matrix equal to the total number of neurons, the activation regularizer augmenting the loss function to measure the activation level of the neuron activation matrix formed by all neurons of the Deep Neural Network on the input samples, thereby sparsifying the number of active neurons in the Deep Neural Network when being minimized;
a data reader module, communicatively coupled to the network model module including a pipeline for obtaining input data for the Deep Neural Network from a plurality of data sources; and
an optimizer, communicatively coupled to the loss function module and to the activation regularizer, configured to adjust the values of variables in the network model module for decreasing an objective function that includes the loss function and the activation regularizer.

11. The activation compressor of claim 10, wherein the neurons comprise the one or more outputs of each layer.

12. The activation compressor of claim 10, wherein the prediction comprises the one or more outputs of the last layer.

13. The activation compressor of claim 10, wherein the loss function module computes the derivative of the penalty value with respect to the prediction.

14. The activation compressor of claim 10, wherein the loss function module comprises the following task-dependent loss function representation:

$$L(X^{(J)}) := \frac{1}{N} \sum_{i=1}^{N} \ell(X_i^{(J)}, Y_i)$$

where $X^{(J)}$: $N \times K^{(J)}$ are the outputs of the last layer of the Deep Neural Network, which provides $K^{(J)}$ scores of each sample that relate to the labels of target task Y: $N \times K^{(J)}$, the task-dependent loss function measuring discrepancy between outputs predicted from the DNN on a given training data set $\{X_i^{(J)}\}_{i=1}^{N}$ and on the given correct outputs on the training set $\{Y_i\}_{i=1}^{N}$.

15. The activation compressor of claim 10, wherein the activation regularizer computes a summation of penalty functions by minimizing which the compressor reduces the number of active neurons in the network.

16. The activation compressor of claim 10, wherein each penalty function in the activation regularizer measures the level of activation of an N×K neuron activation matrix of the Deep Neural Network, the symbol N representing the number of input-samples, the symbol K representing the number of neurons in the Deep Neural Network.

17. The activation compressor of claim 16, wherein the activation regularizer directly regularizes the value of activation, as represented by the following equation:

$$\Sigma_{l=1}^{J-1} \rho_l \|X^{(j)}\|_1$$

where the term $\{\rho_j\}_{j=1}^{J-1}$ denotes the tuning hyperparameters, and the term $\|X\|_1$ (summation of all absolute values of X) denotes a convex surrogate function of X that approximately measures how many non-zero elements are in X.

18. The activation compressor of claim 10, wherein the activation regularizer regularizes a plurality of parameters that control the sparsity level of activation of each layer.

19. The activation compressor of claim 18, wherein the activation regularizer is used together with activation functions having parameters that control the sparsity level of activation, the activation function being represented as follows:

$$[\alpha_r(X)]_k := \begin{cases} vec(X)_k, & k \in top_r(vec(X)) \\ 0, & o.w. \end{cases}$$

which preserves only values of the top-r elements with largest values and suppresses the remaining to be zeros.

20. The activation compressor of claim 10, wherein the data reader module comprises a pipeline for obtaining input data for the Deep Neural Network from a plurality of data sources, the pipeline including at least one cropping, subsampling, upsampling, batching, and whitening and normalization.

21. The activation compressor of claim 10, wherein the optimizer is configured to adjust the values of variables in the network model module for decreasing an objective function that includes the loss function and the activation regularizer.

22. The activation compressor of claim 18, wherein the input data comprises at least one input sample, the at least one input sample including an image, an audio wave, a video dip and/or text.

23. A computer-implemented method for efficient computation of a deep neural network (DNN), comprising:
  (a) providing a network model module for computing the activation value of a plurality of neurons and to compute a prediction, the network model module including a collection of variables that parameterize a Deep Neural Network, the Deep Neural Network being modularized into a plurality of layers, each layer taking the output of one or more previous layers as input data and computes a new set of outputs;
  (b) evaluating gradient of an objective function that includes an activation regularizer by backpropagation through the network model module and a data reader, the evaluating gradient including requesting a gradient of an activation regularizer with respect to the parameters, the activation regularizer comprising a summation of a plurality of penalty functions, each penalty function being computed over a neuron activation matrix, with a first dimension of the matrix equal to the number of samples and a second dimension of the matrix equal to the total number of neurons in the Deep Neural Network, the gradient specifying the change direction of weight values to sparsify the number of non-zero entries in the neuron activation matrix;
  (c) updating DNN parameters based on the gradient by an optimizer for adjusting the values of the collection of variables in the network model module for decreasing the objective function;
  (d) determining by the optimizer whether the change in objective or the magnitude of gradient is sufficiently small based on a predetermined threshold, to indicate that the objective has converged, the optimizer module configured to adjust the values of variables in the network model module for decreasing an objective function that includes the loss function and the activation regularizer,
  when the objective has not converged, iteratively repeating steps (b) and (c), and
  when the objective has converged, generating an output with the activation Deep Neural Network.

24. The method of claim 23, wherein the evaluating gradient step comprises requesting the network module to compute the activation values of all layers $\{X^{(j)}\}_{j=1\ldots J}$, with input data provided by an input preprocessing pipeline.

25. The method of claim 23, wherein the updating DNN parameters step comprises requesting gradient of the loss function with respect to the parameters W (i.e. $\nabla_W L$) from a loss function module.

26. The method of claim 25, wherein the update DNN parameters step comprises requesting the network model to compute the values of the prediction (output) layers $X^{(J)}$, with input data provided from an input preprocessing pipeline to the network model and to correct labels to the loss function module.

27. The method of claim 23, wherein the input data comprises at least one input-sample, the at least one input sample including an image, an audio wave, a video dip and/or text.

28. The method of claim 5, wherein the sparsifying step comprises iteratively tuning one or more parameters associated with the Deep Neural Network based on the gradient.

29. The method of claim 28, wherein the sparsifying step comprises determining whether the Deep Neural Network converges by checking whether the change in the number of active neurons across the neuron activation matrices of all layers that becomes smaller than a predetermined threshold.

* * * * *